United States Patent
Rosaen

(10) Patent No.: US 7,810,276 B2
(45) Date of Patent: Oct. 12, 2010

(54) PLANT SUPPORT ASSEMBLY

(76) Inventor: Lars Rosaen, 46980 N. Territorial Rd., Plymouth, MI (US) 48170

( * ) Notice: Subject to any disclaimer, the term of this patent is extended or adjusted under 35 U.S.C. 154(b) by 782 days.

(21) Appl. No.: 11/738,073

(22) Filed: Apr. 20, 2007

(65) Prior Publication Data

US 2008/0256856 A1 Oct. 23, 2008

(51) Int. Cl.
*A01G 1/00* (2006.01)
*F16L 3/22* (2006.01)
*F16L 3/24* (2006.01)

(52) U.S. Cl. .............................. 47/33; 248/68.1; 248/72

(58) Field of Classification Search ..................... 47/45, 47/47, 44, 33; 403/329, 397; 256/10, 47, 256/49, 50, 51, 52, 54; 248/68.1, 73, 65, 248/74.1, 74.2, 67.7; 119/474
See application file for complete search history.

(56) References Cited

U.S. PATENT DOCUMENTS

| | | | |
|---|---|---|---|
| 510,524 A | 12/1893 | Smith | |
| 1,635,071 A | 7/1927 | Comstock | |
| 2,763,096 A | 9/1956 | Roger | |
| 3,041,783 A * | 7/1962 | Pezdek et al. ................... | 47/44 |
| 3,264,783 A | 8/1966 | Bayliss | |
| 4,840,333 A * | 6/1989 | Nakayama ................. | 248/68.1 |
| 4,922,653 A | 5/1990 | Stone et al. | |
| 5,179,799 A | 1/1993 | Hillestad | |
| 5,423,148 A | 6/1995 | Thornhill | |
| 5,535,969 A * | 7/1996 | Duffy, Jr. ................... | 248/68.1 |
| 5,640,802 A | 6/1997 | Elliott | |
| 6,088,956 A | 7/2000 | Rocka | |
| 6,349,502 B1 | 2/2002 | Fernandez | |
| 6,385,901 B1 | 5/2002 | Wahlberg | |
| 6,487,816 B1 | 12/2002 | Wolter | |
| 6,895,712 B2 | 5/2005 | Gunderman et al. | |
| 6,899,304 B2 * | 5/2005 | Bellmore et al. .............. | 248/65 |
| 7,017,299 B1 | 3/2006 | Speed et al. | |
| 7,043,876 B2 | 5/2006 | LaPelusa | |
| 2005/0217198 A1 * | 10/2005 | Carraher et al. ............... | 52/719 |
| 2005/0253025 A1 * | 11/2005 | Benoit et al. ............... | 248/74.1 |

FOREIGN PATENT DOCUMENTS

| | | |
|---|---|---|
| DE | 202004013870 U | 1/2005 |
| GB | 2232051 A | 12/1990 |
| GB | 2340371 | 2/2000 |
| GB | 2360189 | 9/2001 |

* cited by examiner

*Primary Examiner*—Michael R Mansen
*Assistant Examiner*—Monica Williams
(74) *Attorney, Agent, or Firm*—Gifford, Krass, Sprinkle, Anderson & Citkowski, P.C.

(57) ABSTRACT

A stackable plant support assembly may include two plant support frames that by be vertically stacked or secured to each other, one supporting the other, using a plurality of clips. Each frame may be formed from two or more wire frame portions. The clips, which may be constructed of plastic, may include a body having a pair of spaced apart, parallel channels and a closure that is used to close off the channels. Each channel of the clip(s) may extend through the body such that each channel has a pair of opens ends and an open top. A pair of parallel grooves may also be defined in the surface of each channel. The grooves may allow each clip to engage up to four separate frame portions. Therefore, the clips may be used for securing together and supporting two separate vertically arranged frames by engaging the frame portions of each frame.

13 Claims, 3 Drawing Sheets

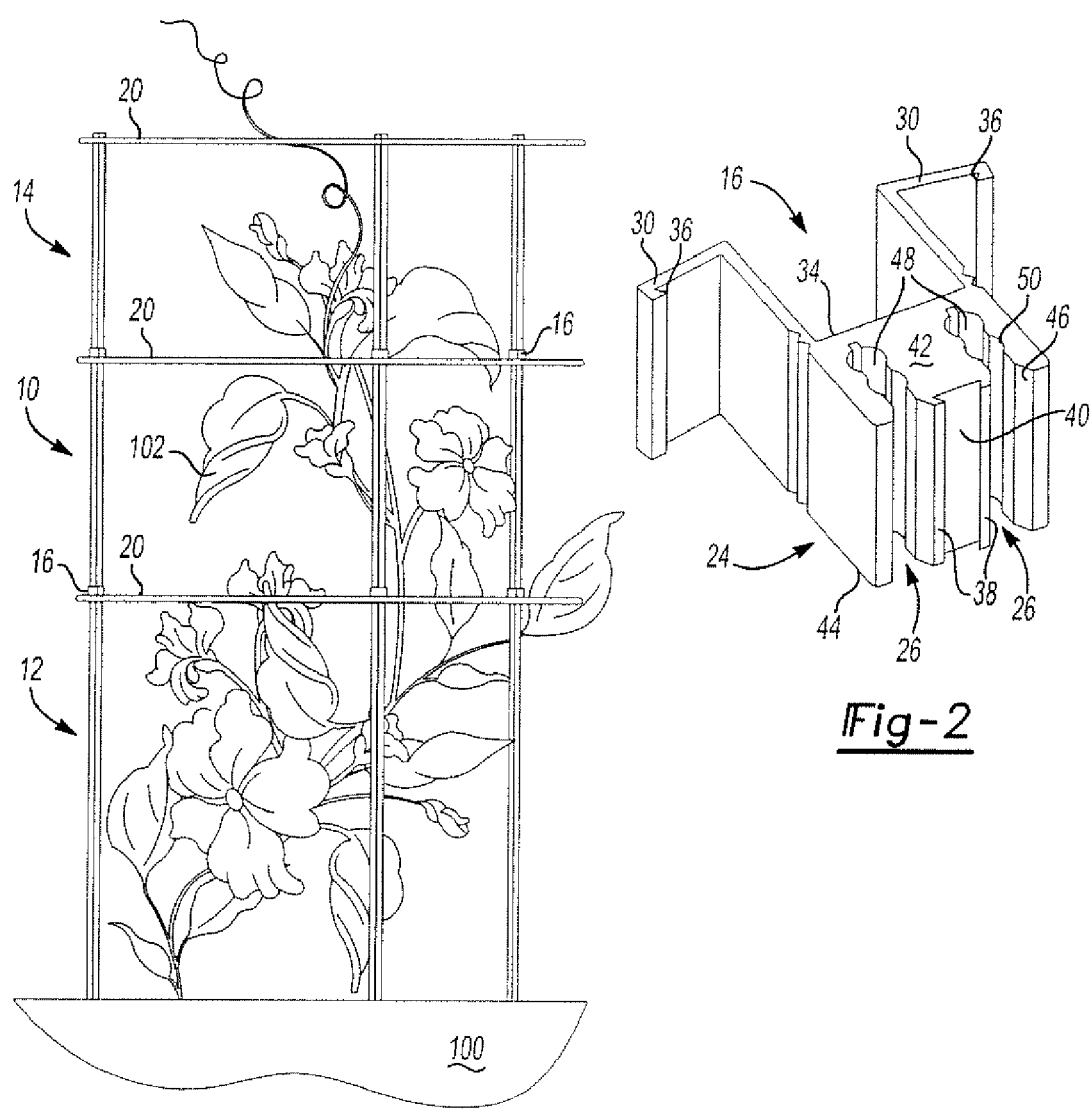
Fig-1
Fig-2
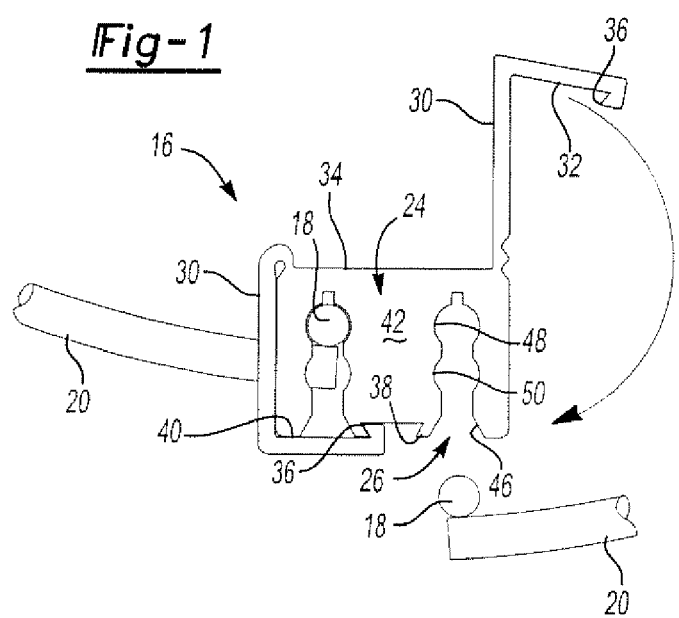
Fig-3

US 7,810,276 B2

PLANT SUPPORT ASSEMBLY

BACKGROUND OF THE INVENTION

1. Field of the Invention

Disclosed herein is an expandable and stackable plant support assembly. More specifically, disclosed herein is a plant support that may include two or more frame portions and a plurality of clips for securing the frame portions together. As such, multiple frames may be secured together to enclose a small or a large area according to the needs of the user. The clips may also be constructed such that each clip may be used to secure a plurality of frame portions and thereby permit one frame portion (or frame) to be stacked on (or vertically mounted to) another frame portion (or frame).

2. Reference to Related Art

U.S. Pat. No. 5,640,802 to Elliot disclosed a support assembly and method for growing tomato plants and the like. The Elliot assembly included a number of interchangeable post sections. Each post section had a ring of horizontal supports and a number of vertical posts. The vertical posts were tapered at one end and included a tapered socket at an end of the post opposite the tapered end. Accordingly, the interchangeable post sections could be easily stacked, one on another, by inserting the tapered end of one section into the socket of a different section.

UK Patent Application No GB 2,360,189 to Milne also disclosed a plant support apparatus. Like Elliot, Milne disclosed an apparatus that used an arrangement of posts and sockets to construct a stackable frame.

The reliance by Elliot, Milne and other prior art supports on a post and socket arrangement overlooked the problem inherent in constructing a plant support around an existing plant; particularly one that may have outgrown any prior supports. These prior art supports must be either lowered over the plant or, alternatively, installed around the plant. See e.g., U.S. Pat. No. 6,385,901 to Wahlberg. However, the known prior art supports that may be installed around a plant are not stackable and do not have the ability to enclose a larger and larger area as the plant grows without causing harm to the plant. Therefore, it would be advantageous to have plant support that could be installed around a plant that also has the ability to be extended vertically as the plant continues to grow.

SUMMARY OF THE INVENTION

A plant support assembly may include one or more frames formed from one or more frame portions that may be releasably secured together by a plurality of clips. Where two or more frames are used, the frames may also be "stacked". Specifically, the frames may be assembled around a plant and in a vertical arrangement (one on the other) to increase the overall height of the plant support structure.

Each frame portion of a plant support frame may be constructed of 3 to 16 gauge steel or like metal wire and include a pair of spaced apart vertical supports or legs and one or more horizontal supports or bars that connect the vertical supports. The horizontal supports of the frame portions may have an arcuate shape with a radius of between 1 and 24 inches (although still larger radii may also be used). As such it will be appreciated that when two or more frame portions are joined together to form a frame, the completed frame may have a generally cylindrical shape.

The clips of the plant support may be used to secure together two frame portions of a plant support frame. Each clip may include a body having a pair of spaced apart, parallel channels and one or more closures (such as a pair of latches). Each channel of the clip may extend through the clip body and include a pair of opens ends and an open top. A first and a second set of opposing grooves may also be defined in each channel. The grooves may be used to frictionally hold the vertical supports of the frame portions. Further the closure may operate to close the top of the channels once vertical support(s) are positioned in the channel grooves.

In operation, each clip may be used to secure together two frame portions to form at least part of a complete plant support frame. Further, at least some of the clips (those near the top of a frame) may also be used to engage and support the vertical supports of a second plant support frame than is mounted on the first plant support frame.

BRIEF DESCRIPTION OF THE DRAWINGS

Reference will now be had to the attached drawings wherein like reference numerals refer to like parts throughout and wherein:

FIG. 1 is an environmental, side view of an embodiment of a plant support apparatus showing a plant, a plant support frame formed from a plurality of frame portions, and a plurality of clips for securing together the frame portions;

FIG. 2 is a side, perspective view of an embodiment of a clip for use in securing together the frame portions;

FIG. 3 is a top, planar view of an embodiment of a clip for use in securing together the frame portions showing one side of the clip secured to a frame portion and an open closure or latched on an opposite side of the clip;

DETAILED DESCRIPTION OF THE INVENTION

A plant support assembly may include one or more frames formed from one or more frame portions that may be releasably secured together by a plurality of clips. Where two or more frames are used, the frames may be "stackable", i.e., they may be assembled in a vertical arrangement (one to the other) to increase the overall height of the plant support structure.

Each frame portion may include a pair of spaced apart vertical supports or legs and one or more horizontal supports or bars. The horizontal supports or bars of the frame portions may have an arcuate shape to give a complete frame a generally cylindrical shape. One end of each vertical support may be inserted in the ground around a plant (or as will be discussed below mounted to a lower frame).

The clips may include a body having a pair of spaced apart, parallel channels and one or more closures. Each channel of the clip may extend through the clip body and have a pair of opens ends and an open top. A first and a second grooves, or sets of opposing grooves, may also be defined in each channel. The grooves may be used to frictionally hold the vertical supports of the frame portions.

In operation, each clip may be used to secure together two frame portions to form at least part of a complete plant support frame. Further, at least some of the clips may also be used to engage and support the vertical supports of a second plant support frame than is mounted vertically to first plant support frame.

Figure 4:
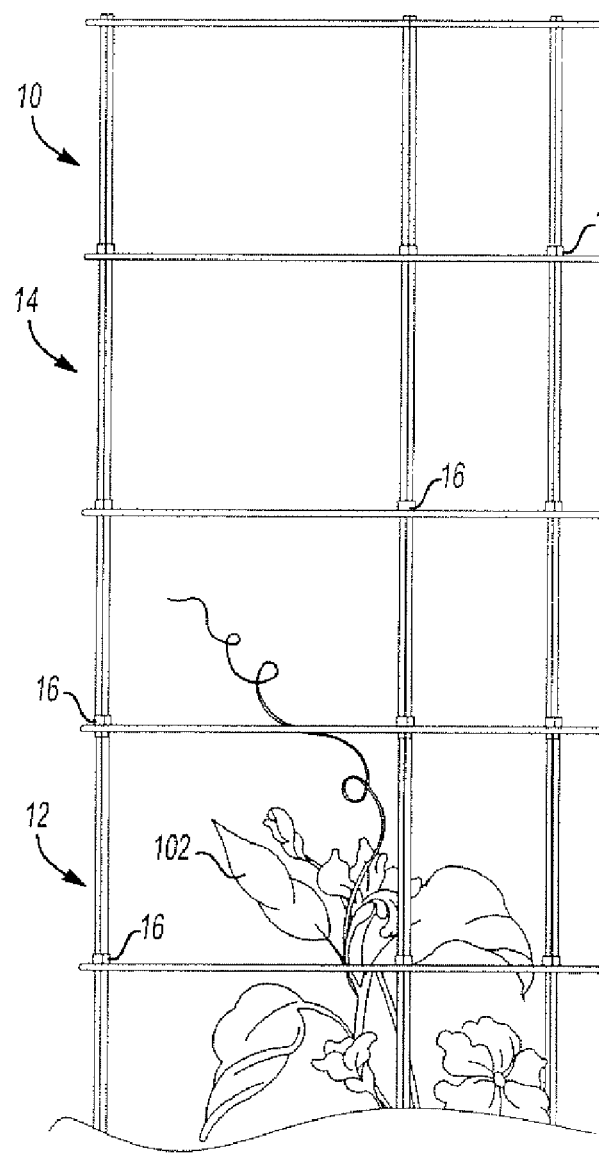
FIG. 4 is an environmental, partially cutaway side view of an embodiment of a plant support showing an upper portion of a support frame of the type shown in FIG. 1 with a second similar frame vertically mounted to the lower frame.

Referring now to FIGS. 1-7, a plant support assembly 10 may include a one or more frames 12, 12', with each frame 12, 12' formed from two or more frame portions 14 and the frame portions 14 being releasably secured together by one or more clips 16. As shown in FIG. 1, two or more frame portions 14 may be set in the ground 100 around a plant 102 and secured together using the clips 16. Further, as shown in FIG. 4, one frame 12' (an upper frame) may also be vertically mounted or arranged on another (lower) frame 12 to increase the overall height of the entire plant support assembly 10.

Figure 6:
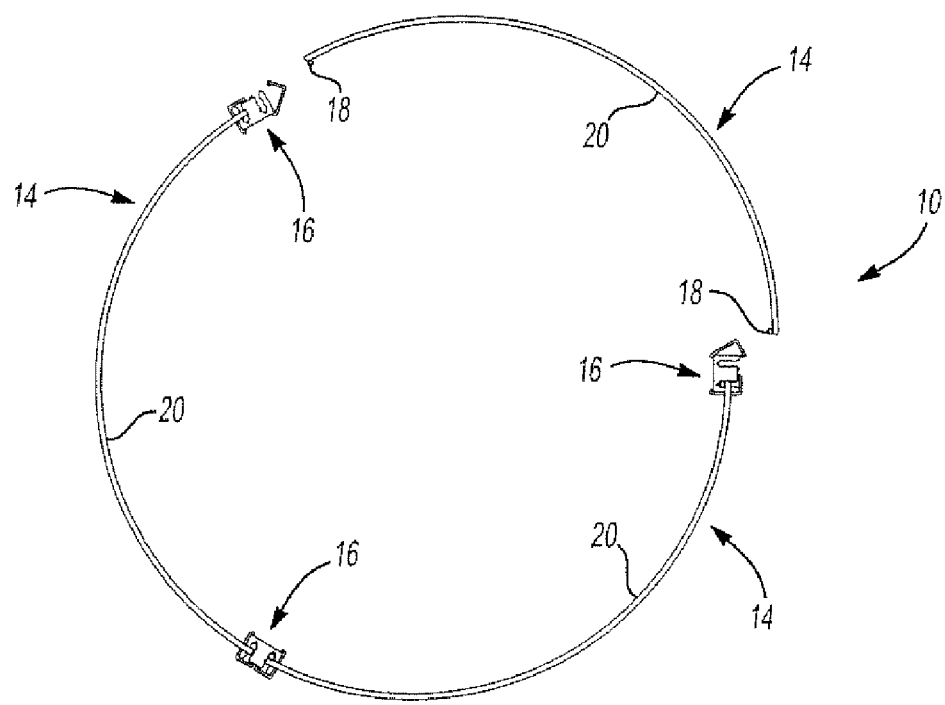
FIG. 6 is a top, planar view of three frame portions being joined together to form a plant support frame.
Figure 7:
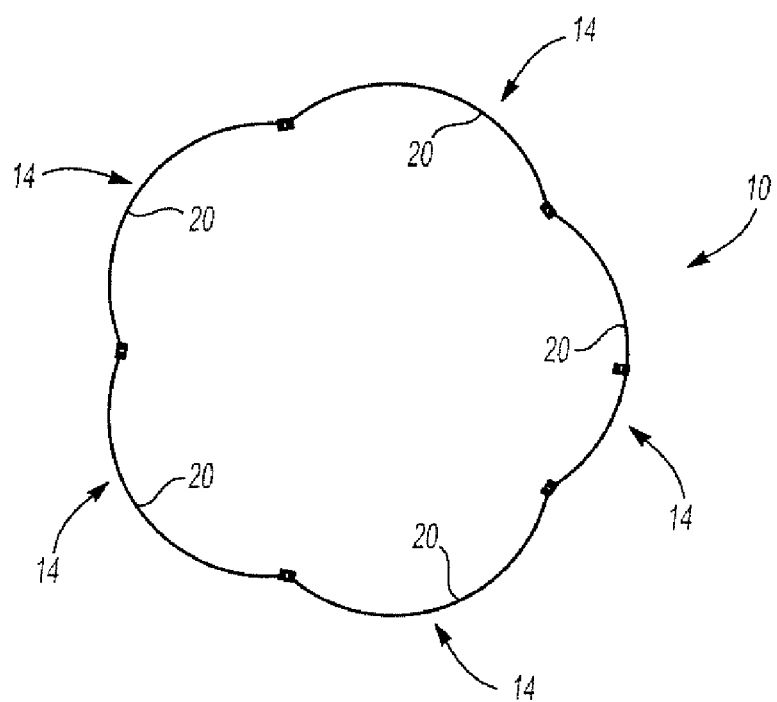
FIG. 7 is a top, planar view of a plant support frame formed using a plurality of frame portions having horizontal supports that have a shorter radius than the horizontal supports of the frame portions shown in FIG. 6.

Referring now to FIGS. 1, 4, 6 and 7, each frame portion 14 may be constructed of 3 to 16 gauge steel or like metal wire and include a pair of spaced apart and vertically arranged wire supports 18 or legs that are connected by one or more horizontal arranged wire supports 20 or bars. The metal wire may be painted or powder coated. Alternatively, the frame portion 14 could also be molded out of plastic. As shown in FIGS. 6 and 7, each horizontal support 20 may have an arcuate shape with a radius of between 1 and 24 inches. As such, it will be appreciated that when two or more frame portions 14 are joined together to form a complete frame 12, the frame 12 may have a generally cylindrical shape. However, it will also be appreciated that the frame portions 14, and thus the frames 12, 12' may be constructed in a variety of shapes (i.e., L-shaped or straight) to permit a user to construct frames 12, 12' of varying size and dimension (e.g., a box, rectangle or triangle).

Figure 5:
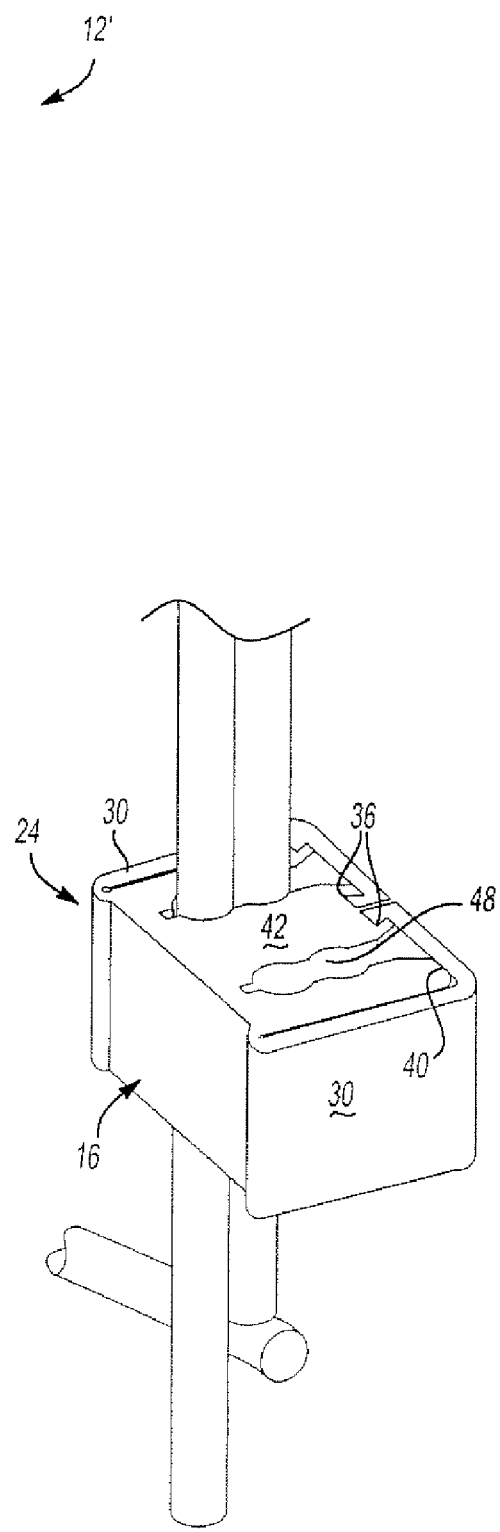
FIG. 5 is a side, perspective view of an embodiment of a clip being used to vertically secure together an upper and lower plant support frame, with the vertical support of an upper frame being shown on the right resting on a horizontal support of a lower frame and the vertical support of a lower frame being shown on the left.

Referring now to FIGS. 2, 3 and 5, each clip 16 of the plant support 10 may be used to secure together two frame portions 14 of a particular plant support frame 12 or 12'. As best shown in FIG. 2, each clip 16 may include a body 24 having a pair of spaced apart, parallel channels 26 and one or more closures 30. The clip(s) 16 may be formed from plastic using standard extrusion processes. Accordingly, as shown in FIGS. 2 and 3, the closures 30 may be molded integrally to the clip body 24. Further, the closures 30 may be formed as a pair of latches 32 that are pivotably attached to a base 34 of the clip body 24. Each latch 32 may include a catch 36 that may engage one of a pair of ridges (or lips) 38 defined in a top 40 of the clip body 24 between the channels 26.

Still referring to FIGS. 2, 3 and 5, each channel 26 of the clip 16 may extend through the clip body 24 and have a pair of open ends 42, 44 and an open top 46. A first 48 and a second 50 groove (or set of opposing grooves) may also be defined in each channel 26. As shown in FIG. 3, the grooves 48, 50 may be used to frictionally hold the vertical supports 18 of the frame portions 14. Further, as mentioned supra, once a vertical support 18 is positioned in one of the grooves 48 or 50 of a channel 26, the closure 30 may be used to close the top 32 of a channel 26 and thereby releasable secure the vertical support 18 within the clip 16.

Referring now to FIGS. 4 and 5, two (or more) plant support frames 12, 12' may also be secured together in a vertical orientation to form a "multi-story" plant support assembly 10'. For example, as shown in FIG. 5, a vertical support 18 of an upper frame may be positioned in one of the grooves 48 of one or more of the clips 16 that are also being used to secure together (using the other groove(s) 50) the vertical support(s) 18 of a frame portion 14 of a lower frame 12. Further, as shown, the vertical support 18 of the upper frame may be positioned so that an end of the support 18 rests on (an is supported by) a horizontal support 20 of a lower frame. Accordingly, it will be appreciated that each clip 16 of a plurality of clips 16 may be used to: 1) secure together the vertical supports 18 of two frame portions 14 of a lower plant support frame 12; and 2) vertically attach a second plant support frame 12' to the lower frame 12 by engaging the vertical supports 18 of the frame portions 14 of that second frame 12'.

Having thus described my invention, various other embodiments will become known to those of skill in the art that do not depart from the scope of the present invention.

I claim:

1. A plant support apparatus comprising:
    a frame including at least two frame portions, with each frame portion having at least two parallel and spaced apart supports; and
    a clip including a body and a closure, with the body defining two parallel and spaced apart channels, each channel extending through the body and having open ends, an open top, a first groove and a second groove, the grooves of each channel extend the length of the channel and are parallel to each other, with the first groove of each channel being proximate a floor of the channel and the second groove of each channel being positioned between the first groove and the top of the channel, the closure operates to close the top of at least one channel, and a support for one frame portion is received in one channel and a support for another frame portion is received in the other channel.

2. The plant support apparatus of claim 1, wherein the parallel and spaced apart supports of each frame portion are vertical supports and each frame portion further comprises a horizontal support connecting the vertical supports.

3. The plant support apparatus of claim 2, wherein a vertical support of one frame portion is positioned in the first groove of one channel of the clip and a vertical support of a second frame portion is positioned in the first groove of the other channel of the clip.

4. The plant support apparatus of claim 3, wherein the frame comprises a first frame, and further comprising a second frame vertically mounted to the first frame, the second frame including at least two frame portions, with each frame portion of the second frame including a pair of spaced apart, vertical supports and a horizontal support connecting the vertical supports.

5. The plant support apparatus of claim 4, wherein a vertical support of one frame portion of the second frame is positioned in a second groove of one channel of the clip, and an end of that vertical support engages the horizontal support of a frame portion of the first frame.

6. A plant support apparatus comprising:
    a first frame including least two frame portions;
    a second frame including least two frame portions, the frame portions of each of the first and second frames having at least two parallel and spaced apart supports, and the second frame being secure to and extending vertically from the first frame; and
    a clip including a body and a closure, with the body defining two parallel and spaced apart channels, each channel extending through the body and having open ends, an open top, a first groove and a second groove, the grooves of each channel extend the length of the channel and are parallel to each other, with the first groove of each channel being proximate a floor of the channel and the second groove of each channel being positioned between the first groove and the top of the channel, the closure operates to close the top of at least one channel, and a support for one frame portion of the first frame is received one channel, a support for one frame portion of the second frame is also received in the one channel, and a support for another frame portion of the first frame is received in the other channel.

7. The plant support apparatus of claim 6, wherein each frame portion of the first and the second frames includes a pair of spaced apart, vertical supports and a horizontal support connecting the vertical supports.

8. The plant support apparatus of claim 7, wherein a vertical support of one frame portion of the first frame is positioned in the first groove of one channel of the clip and a vertical support of a second frame portion of the first frame is positioned in the first groove of the other channel of the clip.

9. The plant support apparatus of claim 8, wherein a vertical support of a frame portion of the second frame is positioned in the second groove of one channel of the clip.

10. The plant support apparatus of claim 9, wherein the vertical support of the frame portion of the second frame that positioned in the second groove of one channel of the clip further comprises an end that engages a horizontal support of a frame portion of the first frame.

11. A plant support apparatus comprising:
a first frame including least two frame portions;
a second frame secure to and extending vertically from the first frame, the second frame including least two frame portions and the frame portions of each of the first and second frames having at least two parallel and spaced apart supports; and
a plurality of clips for fastening together the first and second frames, with each clip including a body and a closure, the body defining two parallel and spaced apart channels, each channel extending through the body and having open ends, an open top, a first groove and a second groove, the grooves of each channel extend the length of the channel and are parallel to each other, with the first groove of each channel being proximate a floor of the channel and the second groove of each channel being positioned between the first groove and the top of the channel, the closure operates to close the top of at least one channel, and a support for one frame portion of the first frame being received the first groove of one channel of a clip, a support for one frame portion of the second frame being received the second groove of the one channel of the same clip, and a support for another frame portion of the first frame being received in the other channel of the same clip.

12. The plant support apparatus of claim 11, wherein the parallel and spaced apart supports of each frame portion of the first and second frames comprise vertical supports, and each frame portion also further comprising a horizontal support connecting the vertical supports of the frame portion.

13. The plant support apparatus of claim 11, wherein the support for the another frame portion of the first frame that is received in the other channel of the same clip is received in the first groove of that channel, and a support of another frame portion of the second frame is received in the second groove of that same channel.

* * * * *